United States Patent
McKay

(10) Patent No.: US 10,602,305 B2
(45) Date of Patent: Mar. 24, 2020

(54) SIGNAL STRENGTH DETERMINATION AND MOBILE DEVICE IDENTIFICATION MONITORING SYSTEM

(71) Applicant: Bulzi Media Inc., Newport Beach, CA (US)

(72) Inventor: Brent Thomas McKay, Newport Beach, CA (US)

(73) Assignee: Bulzi Media Inc., Newport Beach, CA (US)

( * ) Notice: Subject to any disclaimer, the term of this patent is extended or adjusted under 35 U.S.C. 154(b) by 0 days.

(21) Appl. No.: 16/017,903

(22) Filed: Jun. 25, 2018

(65) Prior Publication Data

US 2018/0310126 A1    Oct. 25, 2018

Related U.S. Application Data

(63) Continuation of application No. 15/228,572, filed on Aug. 4, 2016, now abandoned.

(60) Provisional application No. 62/282,504, filed on Aug. 4, 2015.

(51) Int. Cl.
*H04W 4/80* (2018.01)
*H04W 4/021* (2018.01)
*H04W 84/12* (2009.01)

(52) U.S. Cl.
CPC ........... *H04W 4/021* (2013.01); *H04W 4/022* (2013.01); *H04W 4/80* (2018.02); *H04W 84/12* (2013.01)

(58) Field of Classification Search
CPC ........ H04W 4/80; H04W 4/022; H04W 4/021
See application file for complete search history.

(56) References Cited

U.S. PATENT DOCUMENTS

| | | | |
|---|---|---|---|
| 2003/0063619 A1* | 4/2003 | Montano ........... | H04L 29/12009 370/443 |
| 2004/0266457 A1* | 12/2004 | Dupray ................. | G01S 5/0268 455/456.5 |
| 2011/0183626 A1* | 7/2011 | Das ....................... | G01S 5/0252 455/67.11 |
| 2013/0059602 A1* | 3/2013 | Cho ........................ | G01S 5/02 455/456.1 |

(Continued)

*Primary Examiner* — Asghar H Bilgrami
(74) *Attorney, Agent, or Firm* — Knobbe, Martens, Olson & Bear, LLP

(57) ABSTRACT

A consumer sensing and audience measurement system that utilizes the mobile phone carried by the consumer as a proxy for the consumer's location inside a building and consumer attributes. Actions include monitoring wireless communications being provided by one or more mobile devices. A first broadcast identifier indicated in wireless communications can be identified during a first time period. A first location corresponding to the first broadcast identifier can be determined based on a strength associated with wireless communications that indicate the first broadcast identifier. A second broadcast identifier can be identified in the monitored wireless communications during a second time period. A second location corresponding to the second broadcast identifier can be determined based on a strength associated with wireless communications that indicate the second broadcast identifier. A likelihood that the first broadcast identifier and the second broadcast identifier are associated with a same particular mobile device can be determined.

18 Claims, 4 Drawing Sheets

(56) References Cited

U.S. PATENT DOCUMENTS

| | | | |
|---|---|---|---|
| 2013/0229930 A1* | 9/2013 | Akay | H04W 52/0245 |
| | | | 370/252 |
| 2015/0215762 A1* | 7/2015 | Edge | H04W 8/005 |
| | | | 370/338 |
| 2015/0245335 A1* | 8/2015 | Zhou | H04L 47/29 |
| | | | 370/329 |
| 2016/0057565 A1* | 2/2016 | Gold | H04L 67/12 |
| | | | 455/41.1 |
| 2018/0191403 A1* | 7/2018 | Pierson | H04B 17/318 |

\* cited by examiner

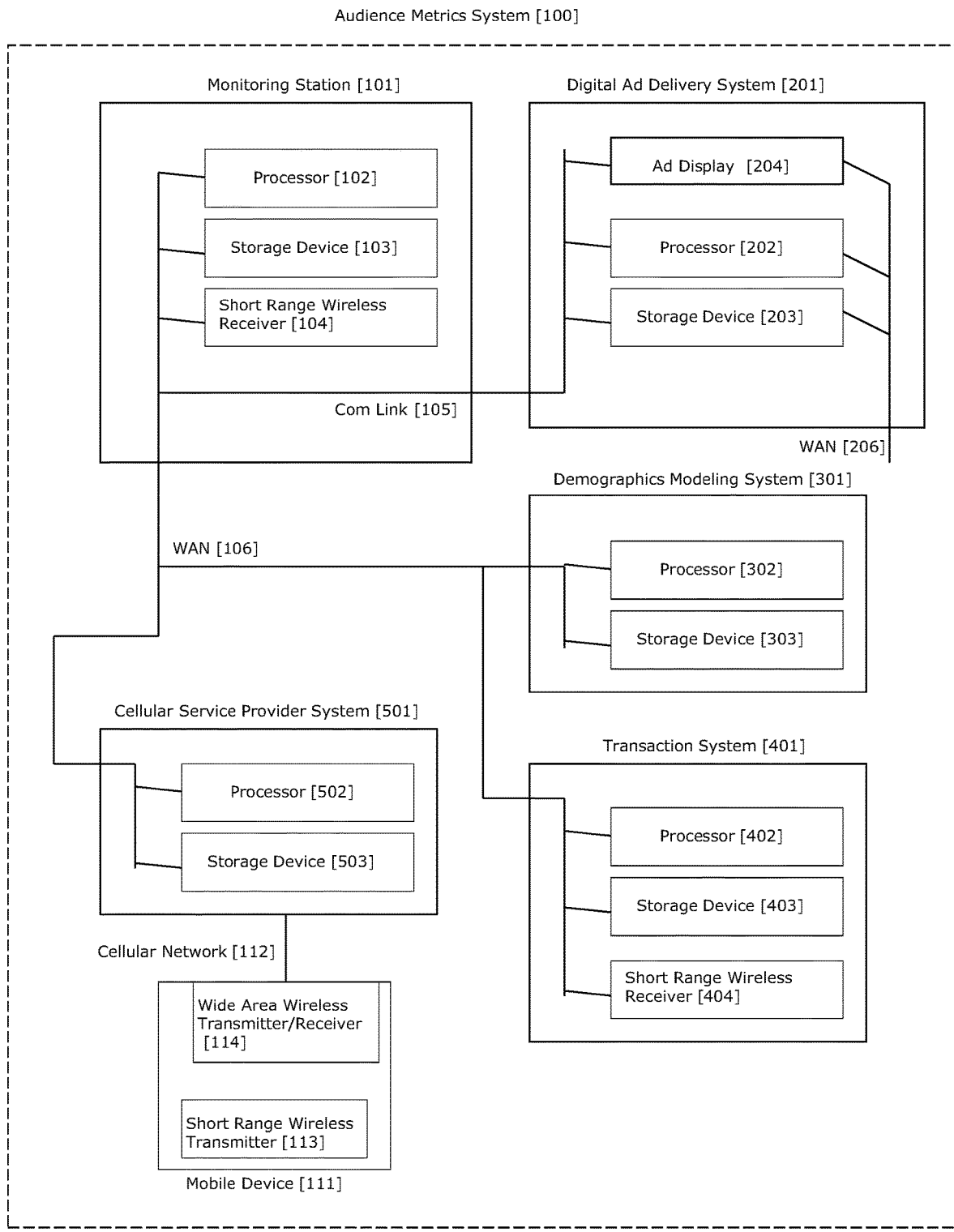
FIG 1. Audience Metrics & Ad Delivery System

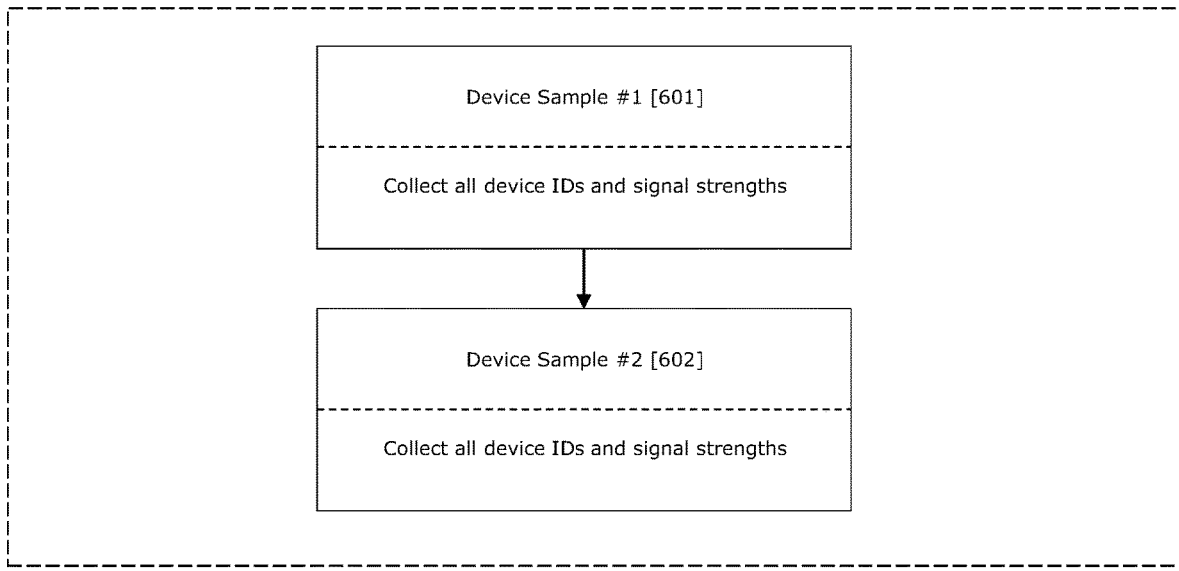
FIG 2. Device Sampling Timeline
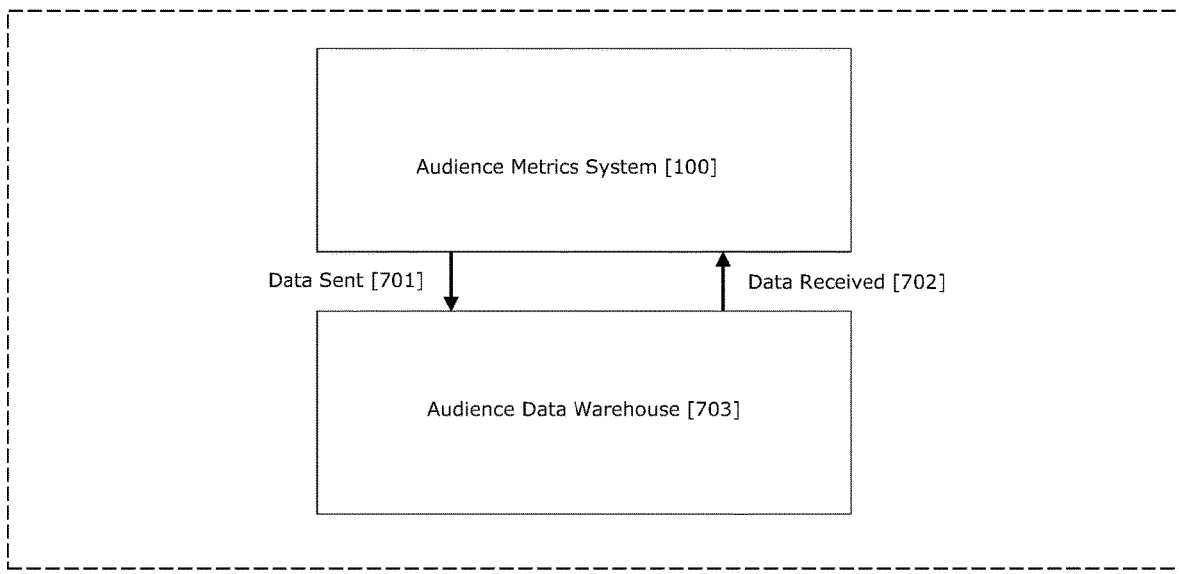
FIG 3. Data Warehouse

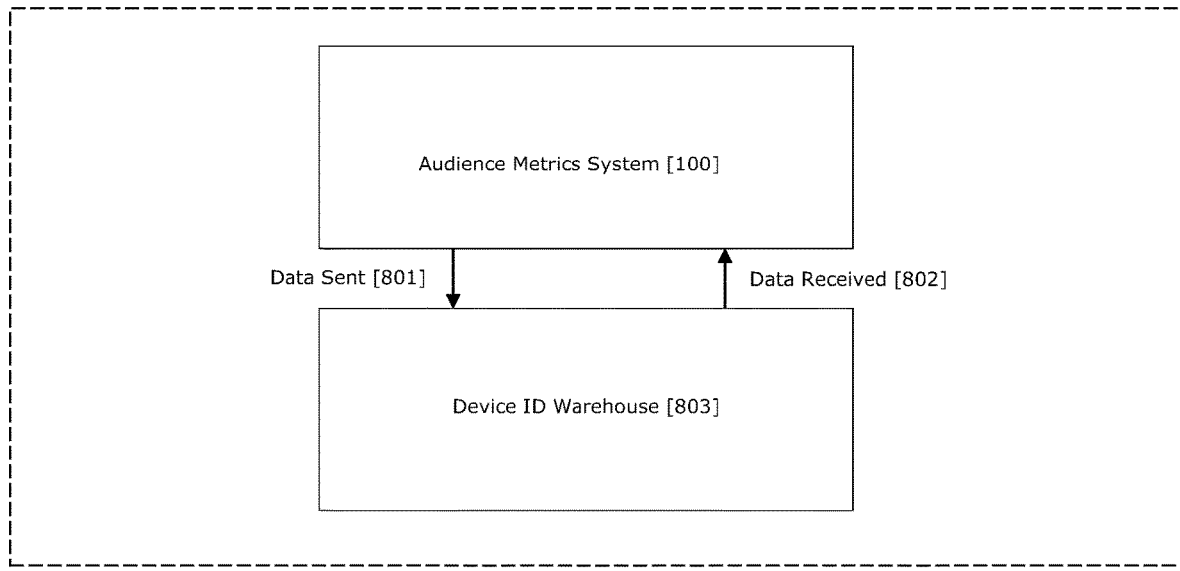
FIG 4. Phantom Device ID Warehouse
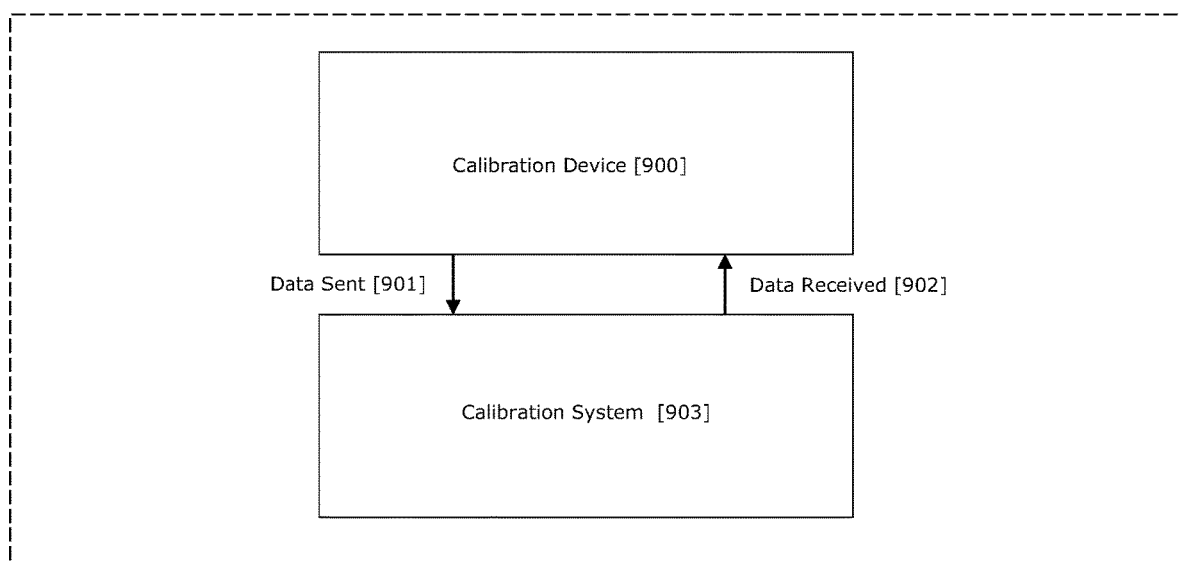
FIG 5. Short Range Wireless Receiver Calibration

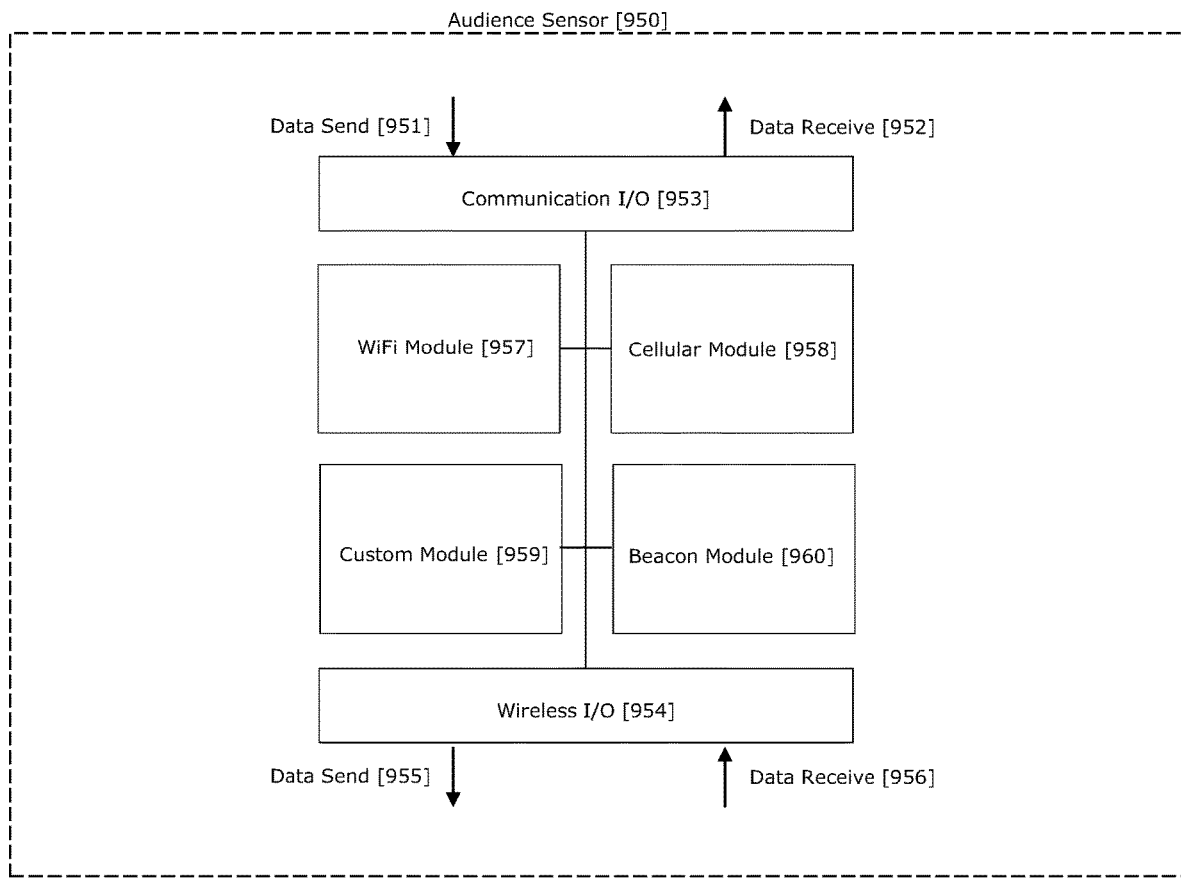
FIG 6. Audience Sensor

SIGNAL STRENGTH DETERMINATION AND MOBILE DEVICE IDENTIFICATION MONITORING SYSTEM

CROSS-REFERENCE TO RELATED APPLICATIONS

The present application is a continuation of U.S. application Ser. No. 15/228,572 filed on Aug. 4, 2016, entitled SIGNAL STRENGTH DETERMINATION AND MOBILE DEVICE IDENTIFICATION MONITORING SYSTEM, which claims the benefit under 35 U.S.C. § 119 of U.S. Provisional Patent Application No. 62/282,504, filed Aug. 4, 2015 (entitled "MOBILE DEVICE IDENTIFICATION FOR ADVERTISING SYSTEM V3"). Any and all applications for which a foreign or domestic priority claim is identified in the Application Data Sheet as filed with the present application are hereby incorporated by reference in their entirety under 37 CFR 1.57.

BACKGROUND

Outdoor Advertising (also known as "Out of Home" or "OOH") is a segment of the advertising market that utilizes a variety of technologies to communicate advertising messages to consumers in public spaces, including the familiar outdoor billboards located next to freeways. Digital Out of Home ("DOOH") is a relatively new segment of OOH that utilizes digital displays connected to networked computers, allowing for an "online-like" advertising system. Online, Addressable TV, and Mobile advertising systems are other forms of digital display advertising well documented in prior art.

Network owners responsible for providing, maintaining, advertising space on DOOH signs have traditionally used manual surveys to establish audience metrics associated with the signs, including estimations of quantities of consumers that have had an opportunity to view the sign, estimations of demographic makeups of the consumers exposed to the sign (e.g., a measure of central tendency of the makeup, such as a mean, median, average, and so on), and so on. These traditional methods are time consuming to develop, not very accurate, and model averages associated with consumers over (1) long periods of times (e.g., years) and (2) large areas (e.g., all, or a large quantity of, shopping malls in the US for a mall DOOH operator). As a result, DOOH model is typically low-value "run-of-network" and the credibility of determined metrics, accordingly, is low. Systems that can improve on any of the above-described deficiencies can deliver benefit by improving accuracy of determined metrics and better utilize the DOOH inventory.

In other patent applications previously filed by the present inventor, various methods for characterizing DOOH audiences using mobile phones as a proxy for the consumer exposed to the DOOH signs were described. Some of these described methods relied on identification of the mobile device in close proximity to the DOOH display to estimate audience counts and characterizations.

Particular mobile phone operating systems may periodically transmit a "phantom" WiFi Media Access Control (MAC) address (e.g., randomized MAC address) that is not the actual WiFi MAC of the device. This disclosure describes systems and methods to optimize the audience count and characterization in light of this.

SUMMARY

This disclosure relates to audience measurement and metrics systems for digital display advertising and, in particular, to a system for generating ad exposure counts and demographic/psychographic characterization of audiences exposed to digital advertising displays using mobile devices in proximity to the advertising inventory as a proxy for the consumer carrying it.

It is an object of the present disclosure to provide an automated system and method for developing a reasonably accurate measurement of the number of individuals and the group's combined demographic/psychographic makeup ("Audience Profile") exposed to a single OOH ad for improved ad targeting and campaign reporting. It is another object of the present disclosure to minimize the impact of phantom mobile device identifiers on the quality of these measurements.

It is another object of the present disclosure to allow for an efficient mechanism to build an indoor map of a building which is geocoded to its location, allows for accurate mapping of mobile devices to their location in the building, efficiently maps the products in a retail store to their corresponding location in the building, updates this data regularly and makes the information available to digital systems for searching and marketing purposes.

As will be described in more detail, techniques are included that solve problems specifically arising out of technology. That is, metrics associated with effectiveness digitally provided content (e.g., advertisements) can be determined accurately through monitoring locations of consumers utilizing mobile devices. Identifying information of mobile devices (e.g., MAC address) can be parsed from WiFi connections, Bluetooth connections, and so on, with the mobile devices, and correlated with measured signal strengths, such that mobile devices can be (1 uniquely identified and (2) triangulated, while accounting for randomization associated with, for instance, MAC addresses of the mobile devices.

BRIEF DESCRIPTION OF DRAWINGS

FIG. 1 illustrates block diagram of a system according to one embodiment of the present disclosure.

FIG. 2 illustrates block diagram of a device sensor sampling timeline and other embodiments of the present disclosure.

FIG. 3 illustrates block diagram of a system according to another embodiment of the present disclosure wherein personally identifiable data is resident at a third-party data warehouse.

FIG. 4 illustrates block diagram of a system according to another embodiment of the present disclosure wherein device IDs are collected and analyzed to determine if they are phantom device IDs.

FIG. 5 illustrates block diagram of a system according to another embodiment of the present disclosure wherein a mobile phone is used to calibrate the perimeter of interest.

FIG. 6 illustrates block diagram of an audience sensor according to other embodiments of the present disclosure.

DETAILED DESCRIPTION

In the following description of the preferred embodiment of the present disclosure, the term "demographics" is used frequently. While this term is sometimes used within the media industry to describe a finite set of commonly used population characterization criteria (e.g., age, income, ethnicity, and so on), the term as used herein further encompasses the broadest possible sense of any characteristics of human populations and population segments (e.g., used to identify consumer markets). This includes criteria traditionally called psychographics, as well as historical purchase behaviors or online we browsing behaviors, for example.

FIG. 1 illustrates an Audience Measurement System 100 (e.g., a system of one or more computers, one or more virtual machines executing on a system of one or more computers, and so on) according to one embodiment of the present disclosure that includes a Monitoring Station 101, connected through a Wide Area Network (WAN) communications network 108 to a Demographics Modeling System 301, Transaction System 401, and Cellular Service Provider System 110.

The Monitoring Station 101 includes at least one Processor 102 and at least one Storage Device 103 (e.g., one or more computer program products, one or more computer storage media, and so on) storing processor-executable instructions, as well as at least one Short Range Wireless Receiver 104 capable of recognizing signals from a suitably-equipped and configured Mobile Device 111 with at least one Short Range Wireless Transmitter 113; typically the short range communication method would be a standard such as WiFi, Bluetooth, or NFC.

The Monitoring Station 101 is also connected via Com Link 105 (e.g., wired or wireless communication connection, channel, and so on) to a Digital Ad Delivery System 201 that includes at least one Processor 202 and at least one Storage Device 203 storing processor-executable instructions, as well as at least one Ad Display 204 for rendering digital ads. The Com Link 105 may be any suitable local or wide area based connection such as RS232, Ethernet, or WiFi, for example. In an example embodiment, the Monitoring Station 101 and Digital Ad Delivery System 201 are in close proximity, although they may also be some known (e.g., threshold) distance and direction (e.g., magnitude, direction, of a vector) with respect to each other. In some embodiments of the present disclosure, some or all of the Digital Ad Delivery System 201may share the same hardware and reside within the same physical enclosure as the Monitoring Station 101. The Digital Ad Delivery System 201may also be connected to a separate WAN 206 for communication with a remote ad server, or share the WAN 106 connection with the Monitoring Station 101.

The Cellular Service Provider System 501 is wide-area wireless service provider (e.g., Verizon, Sprint, and so on) that provides (e.g., enables, directs, maintains, establishes) communications for mobile devices through the Cellular Network 112; such communications are typically made through the Wide Area Wireless Transmitter/Receiver 114 of the Mobile Device 111, which communicates with remote cell towers that may be a part of the Cellular Service Provider System 501. The Cellular Service Provider System 501 includes at least one Processor 202 and at least one Storage Device 203 storing processor-executable instructions, and provides voice and data connectivity of mobile devices over long distances typical of mobile device usage through these cellular communications towers.

The Demographics Modeling System 301 includes at least one Processor 302 and at least one Storage Device 303 storing processor-executable instructions, and is connected to other parts of the Audience Measurement System 100 through the WAN 106. The Demographics Modeling System 301 combines measurements and estimates of the number of individuals and the demographic/psychographic makeup of each individual into combined Audience Profiles exposed to a single ad rendered on the Ad Display 204. The source of this audience data comes from the Monitoring Station 101, and may be supplemented by other measurement sources or systems (e.g. outside systems). The Demographics Modeling System 301 also combines these Audience Profiles for individual ads rendered multiple times on the Ad Display 204 or on other Ad Displays for ad campaign reporting of combined reach, frequency, gross and targeted impressions generated, and other reporting criteria.

The Transaction System 401 includes at least one Processor 402 and at least one Storage Device 403 storing processor-executable instructions, as well as at least one Short Range Wireless Receiver 104 capable of recognizing signals from a suitably-equipped and configured Mobile Device 111 with at least one Short Range Wireless Transmitter 113; typically the short range communication method would be a standard such as WiFi, Bluetooth, or NFC. The Transaction System 401 is connected to or a part of a Point-of-Sale ("POS") transaction terminal which executes retail transactions.

Referring again to FIG. 1, the Short Range Wireless Receiver 104 monitors wireless emissions from the Short Range Wireless Transmitter 113 of Mobile Device 111. These transmissions may include industry standard protocols like WiFi or Bluetooth, carrier-oriented transmissions related to their 3G or 4G communications protocols, or other wireless transmissions specific to the Mobile Device 111. In other patent applications previously filed by the present inventor, various methods for characterizing DOOH audiences using mobile phones were described which, in some cases, utilized the WiFi transmissions (e.g., MAC address associated with the WiFi transmissions) broadcast by the mobile device to identify the presence, location, and unique identity of the mobile device.

Particular mobile phone operating systems (e.g., Apple iOS, such as iOS 8) may periodically transmit a "phantom" WiFi Media Access Control (MAC) address (e.g., randomized MAC address) that is not the actual WiFi MAC of the device (e.g., assigned to the device, for instance by a manufacturer). As a result, if the WiFi MAC is being used as described above, the phantom MAC may eventually be seen by the Demographics Modeling System 301 as a different device, thus lowering the accuracy of the resulting audience profile. In addition, if the phantom MAC were broadcast during an audience sampling period the result could be inclusion of two devices in the count rather than one (e.g., as expected).

FIG. 2 illustrates two sequential audience sampling measurements made by the Monitoring Station 101. In one embodiment of the present disclosure the Monitoring Station 101 identifies all, or a threshold number of, WiFi MACs in range (e.g., a threshold range) of the Short Range Wireless Receiver 104. One or more of the MAC identifier and the signal strength can be recorded for each device, and stored in the Storage Device 103. Predetermined business rules can be applied for determining which signal strengths likely correlate to the corresponding mobile device being located in an area of interest at that time, such as a viewing area of an advertising display in proximity (or in a retail store area of interest adjacent to certain products). In other embodiments multiple short range wireless receivers can be used in order to triangulate position (e.g., based, at least in part, on signal strength), as is known by one with ordinary skill in the art.

Referring again to FIG. 2, in an example embodiment of the present disclosure, the WiFi MACs can be encrypted by the Monitoring Station 101 prior to transmission to other parts of the system to enable and ensure a privacy-safe solution.

The data privacy can be further improved by requiring all transmission and storage of the data be in encrypted form while inside the Audience Metrics System 100, as shown in FIG. 3. Encrypted device IDs can be sent by the Audience Metrics System 100 to the Audience Data Warehouse 703 as shown (see Data Sent 701). The Audience Data Warehouse 703 can hold encryption keys and return to the Audience Metrics System 100 targeting attributes associated with the mobile device (see Data Received 702. The Audience Data Warehouse 703 can optionally specialize in (e.g., include functionality that enables) handling personally identifiable information and can be subject to specialized data handling precautions, processes, and audits that allow for higher levels of consumer privacy. This would also be commercially beneficial in that it would not require the various advertising systems using the data warehouse to implement these additional controls and incur the costs.

Referring again to FIG. 2, if the WiFi MAC broadcast by a mobile device during the first sampling period (Device Sample #1 601) were changed some time later (e.g., a threshold period of time) during a secondary sampling period (Device Sample #2 602), then the Demographics Modeling System 301 (FIG. 1) using this data may (e.g., erroneously, in some situations) assume that two different devices were present. Thus, the analytics rules of the Demographics Modeling System 301 can include, specify, compensation logic that can recognize a mobile device as being present some distance from the Short Range Wireless Receiver 104 with a corresponding signal strength that would not likely disappear (e.g., the signal strength is greater than a threshold, such that it can be measured accurately and not be unmeasurable if it was reduced) and correspondingly another device also appear with a similar signal strength. The likelihood that two different devices adjacent to each other (or the exact distance from one point) simultaneously started broadcasting their device ID while the other stopped broadcasting its device ID is very small given the typical usage patterns of these devices.

The aforementioned compensation logic can therefore operate on two sets of device IDs (e.g., MAC addresses) and their respective signal strengths which were captured (e.g., measured, determined, as by receiving information from an outside system or the mobile devices) by the same sensor (Short Range Wireless Receiver 104), or two or more sensors with known or determinable offsets, some relatively small time difference apart (for example, a few seconds). In one embodiment of the present disclosure, the logic would record the distance from the sensor estimated for each mobile device (extrapolated from the recorded signal strength) for both sampling periods, and the time differential between sampling periods, to identify the likelihood that they are actually the same device broadcasting two different device IDs. As a non-limiting example, if a first mobile associated with a first broadcast identifier (e.g., MAC address) is determined to be located a particular distance from one or more sensors (e.g., triangulated position), and a threshold amount of time later (e.g., 100 ms , 1 second, 3 seconds), a second broadcast identifier is determined to be located the same particular distance from the sensors while the first broadcast identifier is no longer detected (e.g., determined), the likelihood that the first and second broadcast identifiers are both associated with the first mobile device can be increased.

One element of the probability assignment (e.g., likelihood) can include one or both mobile devices appearing to travel inside or outside of the sensor range during the two sampling periods, which, in some example cases given typical sensor technology, would be unlikely within a few seconds as is typical of the use case. This assignment would assume that neither mobile device was turned on or off, nor their mobile device ID broadcasting feature was turned on or off during the two sampling periods, since this would be a low probability occurrence during a typical use case. Therefore having two mobile devices change their ID broadcasting profile "simultaneously" (between two sampling periods a short time apart) and also be near identical distances from one point (the sensor embedded in the Short Range Wireless Receiver 104) would be statistically very small. Because the Demographics Modeling System 301 and its associated advertising systems operate in high volumes and without negative consequence of individual miscalculations, these assumptions are well within the requirements of such a system.

The previously described embodiments of the present disclosure can allow for a probabilistic method of identifying when a particular mobile device included in two (e.g., two or more) of the sampling periods illustrated in FIG. 2 modified its broadcasted device ID (e.g., WiFi MAC address). While this may improve the accuracy of reach and/or frequency calculations for particular reporting purposes, it may not allow for proper identification of audience attributes to the mobile device.

The phantom WiFi functionality described above may not always transmit a phantom WiFi MAC address, so one element of improvement is in identifying times at which a phantom MAC are being broadcast, and times at which an actual MAC is being broadcast. As phantom MACs are identified, the system (e.g., system 100) can create and store information identifying (e.g., a list, database) of phantom MACs, thereby the enabling the system to query this information and efficiently determine if it is a phantom MAC address.

In another embodiment of the present disclosure, when two mobile device IDs are identified as being likely associated with the same mobile device as described above, the two mobile device IDs can be provided, transmitted, to a Device ID Warehouse 803 as illustrated in FIG. 4. This system (e.g., warehouse 803) can include at least one Processor and at least one Storage Device storing processor-executable instructions, which, when executing said instructions would perform a variety of tasks related to identifying phantom device IDs and returning additional data to the Audience Measurement System 100 to compensate.

Unique device IDs associated with mobile phones/devices may be controlled and issued by a centralized organization to ensure there is a one-to-one correlation without duplication. If a mobile device broadcasts a WiFi MAC that is not actually assigned to the mobile device (e.g., as described above), it is possible that the ID is already assigned to another mobile device or is a part of an unassigned pool. The Device ID Warehouse 803 can compare the device ID in question against a database of assigned IDs, and identifying (e.g., flag) when one is currently unassigned (e.g., the Warehouse 803 can access information indicating assigned IDs). This can be utilized to identify (e.g., with a very high degree of probability) that the device ID in question is a phantom.

If the ID in question is a part of an assigned pool but being broadcast as a phantom ID of the device actually in proximity to the Short Range Wireless Receiver 104, the Device ID Warehouse 803 may need to employ additional analytics to determine if it is likely phantom or legitimate. In another embodiment of the present disclosure, the location history of the two device IDs are compared against the present location associated with the Short Range Wireless Receiver 104. Since a phantom device ID would likely be created by a random generator, the likelihood of the actual mobile device associated with the phantom ID being owned and carried by a consumer in the same city or general area to the consumer of the actual device ID is very low. Therefore, the creation of a probability measure of the likelihood of a device ID being phantom based on the historical concentration of previous location activity would be of great usefulness, and in this embodiment would be scored against the second ID to create a probability that one or the other is a phantom ID.

In a similar manner, the historical location activity of any mobile device ID can be used on a standalone basis to develop a probability measure that it is a phantom ID. Numerous specific algorithms can be used, and one or more example algorithms may include the distance from the location of the mobile device (as measured or estimated by the Short Range Wireless Receiver 104) compared to a historical average or predominant area as the basis for determining the probability that it is phantom, at least in part. The Device ID Warehouse 803 may store the previous location records of a given device ID or connect to remote databases to request such an analysis.

In this embodiment, the system can measure the distance between the current location of the mobile device, as reported by the mobile device or measured by a sensor external to the mobile device, against one or more previously recorded locations of the same mobile device ID, to estimate the probability that the mobile device ID from the current location was from the same mobile device as the previous location records, wherein the distance between those previous locations and the current one are used at least in part to estimate the probability. In a further enhancement to this embodiment, the number of previously recorded locations can also be used in the probability analysis.

In another embodiment of the present disclosure, the previous location history of the mobile device ID in question can be analyzed against both distance and time. The rationale behind the computer logic is that if the same mobile device ID is determined to be present in two locations some distance apart "D" and some time apart "T," then at some point the ability for the mobile device to meet the D distance over the time T becomes practically impossible. The probability function for this is not a step function, but rather proportional related to both time and space. Two occurrences of a mobile device ID a short time apart and a long distance apart will generate the lowest probability that they were actually generated by the same mobile device, and that at least one was phantom.

As described previously, the Device ID Warehouse 803 could compare the mobile device ID's location as identified by its presence in the range of the Short Range Wireless Receiver [104] (which location was previously identified) with previous occurrences of the same device ID in other locations. If the device ID being broadcast was a phantom ID that was already assigned to another mobile device, the location history of the phantom ID (which was the actual ID of some other device) would, in general, suggest a high probability that it was a phantom ID since it would its location history would be highly concentrated in an area some distance away.

In another embodiment, the Device ID Warehouse 803 can compare more than one mobile device ID type stored there with other mobile device IDs generated by the same mobile device. For example, if the Short Range Wireless Receiver [104] was configured to recognize both WiFi and Bluetooth MACs and both were sensed by the device during a sampling period, then both IDs could be sent to the Device ID Warehouse 803, and a database of Bluetooth MAC to WiFi MAC associations could be generated and used to create the audience attributions. As an example, a WiFi MAC may be identified as likely a phantom ID but the Bluetooth ID may be identified as likely legitimate, and the Demographics Modeling System 301 can use the audience attributes associated with the Bluetooth MAC instead of the phantom WiFi MAC. The same process can be applied to all unique Identifiers of the mobile device that may be stored in the Device ID Warehouse 803.

In another embodiment, the Device ID Warehouse 803 can compare the mobile device ID identified by the Short Range Wireless Receiver 104 with other mobile device IDs that were present in close proximity at the time the Short Range Wireless Receiver 104 captured the location record, but were instead identified through Wide Area Wireless Transmitter/Receiver 114 of the Mobile Device 111.

The Wide Area Wireless Transmitter/Receiver 114 location records typically are generated in connection with a mobile ad request, a location-based mobile application, or some mobile operating system activity that reports the device's location.

The Short Range Wireless Receiver 104 location records can typically be generated by an industry-standard local wireless communication protocol such as WiFi or Bluetooth, by mobile network communication standards such as the 3G or 4G wireless device ESNs, or by device-specific wireless signatures broadcast by the device that are independent of standard communication protocols.

In a preferred embodiment all of these device location and unique identification values would be routed to the Device ID Warehouse 803 for analysis.

In this embodiment, the Device ID Warehouse 803 can analyze the unique mobile device identifiers captured by the Short Range Wireless Receiver 104 (the "target device") against any other unique device identifiers that were recorded by the Wide Area Wireless Transmitter/Receiver 114 as being present during a similar time frame and within a predetermined distance from the Short Range Wireless Receiver 104 ("reference devices"). The location of the target device can be compared to the recorded locations of other reference devices in proximity around the same time (e.g., within a threshold time period). The recorded locations of these other reference devices can include some data about the source of the location record (GPS-derived and possibly how many satellites were in range and their signal strengths, cell tower triangulation, WiFi-assisted, etc.). This source data can be used to estimate the accuracy of the location as recorded by the Wide Area Wireless Transmitter/ Receiver 114 for the reference device, so that a further refinement of the association algorithm can be achieved. The algorithm can use the accuracy of the reference device's recorded location to assign a probability that the reference device was actually in close proximity to the target device at the time the target device location was established by the Short Range Wireless Receiver 104.

This embodiment would further create an association "index" (e.g., information indicating associations) as a probability measure that the target device, and any one of the reference devices, were actually one and the same. The index can be based on the distance each reference device was estimated to be from the target device, the accuracy of the reference device location record, and the time differential between the two location records.

If the association index reached a predetermined threshold, the target and reference devices would be considered by the system to be the same device, and all attributes from each would be merged. A probability measure for the association can be retained. In a typical use case the target device, for which associated audience metrics may be limited or non-existent, can be associated with a reference device, for which rich audience metrics might be available. As a result, the commercial value of the system would be greatly improved.

FIG. 5 illustrates another embodiment of the present disclosure that facilitates calibration of the Short Range Wireless Receiver 104 to more accurately identify a perimeter of interest. The Calibration System [903] includes at least one Processor and at least one Storage Device storing processor-executable instructions, which can analyze location data received from the Calibration Device [900] via its cellular service (through Data Sent [901]) and return data to the Calibration Device [900] through Data Received [902] as needed.

The Short Range Wireless Receiver 104 can be calibrated upon installation (and later as required) by using a mobile device (Calibration Device [900]) to establish the signal strength profile of the perimeter of the desired area to be measured. Typically this would be the viewing area of the advertising display or audio reception area for audio ad systems. Since the Short Range Wireless Receiver 104 is designed to identify mobile devices and their signal strength, a properly configured system can allow a technician to simply carry a mobile phone/device while walking the perimeter of the area in question in order to gather the calibration data. Some kind of registration of the calibration unit can be performed in order for the desired location records to be extracted and analyzed by the Calibration System [903], and some method for establishing the start and stop times for the perimeter walk would need to be established.

In a preferred embodiment, the technician conducting the calibration would use a mobile application running on his/her mobile smart phone ("Calibration Device") to conduct the calibration process. The application would allow him/her to identify the Short Range Wireless Receiver 104 MAC or register the technician's mobile phone's unique identifier(s) such as the WiFi MAC, with the Calibration System [903]. Once registration is complete, in a preferred embodiment the technician would simply walk to one point on the perimeter, select "Start Calibration" on the mobile application, walk the perimeter, and then press "End Calibration." The data analysis could then be conducted by the Calibration System [903] in order to determine the signal strengths received by the Short Range Wireless Receiver 104 around the perimeter of interest. If multiple Short Range Wireless Receivers were deployed in the area of interest, then triangulation formulas could be used to determine the actual location profile of the perimeter and determine more accurately any combination of signal strengths representative of the interior of the area of interest.

An additional improvement of the Calibration System [903] can be achieved by using a Calibration Device that includes accurate positioning such as GPS or next-generation gyroscope/magnetic/other embedded technologies designed to improve location accuracy indoors. In this way, the Calibration System could not only create a perimeter of interest but geo-locate it with precise latitude/longitude coordinates. Optionally, information indicating a path that the technician is following can be utilized to more accurately calibrate the system. For instance, the technician may traverse a known path around the perimeter of interest, and the system can access the known path information and compare it to measure signal strengths. Additionally, the technician may wear a device that can measure walking speed or number of steps, and the system can utilize the measured information to more accurately determine estimates of the technicians' location. Similarly, one or more cameras (e.g., stereo cameras), sensors (e.g., Lidar, Leddar, sensors) can monitor movement of the technician, and can determine locations of the technician as he/she maneuvers around the perimeter or other area.

In another preferred embodiment, multiple Short Range Wireless Receivers 104 can be deployed throughout the facility in a manner such that the mobile phone identifiers and signal strengths can be collected and analyzed to trilaterate (e.g., triangulate) each mobile device to its specific location in the building or other area (e.g., within a threshold distance of the actual location of a mobile device). Over time all possible locations for mobile devices in the building, or area, would be registered and collected in a database (corresponding to common areas and pathways) and locations unavailable to human traffic would not show up in the database (or be very low instances accounting for inaccuracies in the measurement technologies). This location database could therefore be used to programmatically build an internal pathway map for the building, and once set up could be "crowd sourced" using the normal consumer movements inside the building.

There is currently a very active market working to develop technologies and methods for leveraging mobile device location awareness inside of retail stores in order to provide enhanced marketing services near the Point of Purchase (POP) to the consumer through their mobile phone. The two biggest challenges in achieving large scale adoption of this new intelligent POP model is creating the indoor mapping which using traditional methods is time consuming and accurately positioning the mobile phone within the map. The present description addresses these deficiencies in the prior art by automating the process, and is further enhanced by the fact that it will continue to "learn" and update if the interior spaces are changed over time, thus improving the functioning of systems that leverage such information.

The third element for supporting the optimal intelligent POP system is the location of products within the map. In a typical retail store these products are frequently being moved and are continuously being bought and restocked. If the objective is to guide a consumer to the right location in the store to find a specific product of interest or product category of interest (using their smart phone as the guide), some method for associating the products to the indoor mapping system of the present disclosure is required. In an example embodiment, a video camera device equipped with similar location technologies as a smart phone can be used to video the product shelves and automatically map the products to the locations inside the store. Using appropriate video analytics software, the video could be automatically parsed into the products present in the store and then mapped into the location on the floor and the third dimension (on which shelf). In a preferred embodiment this process would be run automatically every night after hours by a drone or other robot (e.g., Unmanned Aerial Vehicle, Unmanned Vehicle, and so on).

An additional enhancement to the aforementioned system would be achieved by coupling the indoor product database to search engines so that a consumer could find products in the local area in retail stores similar to what is done online currently. A query for a specific product would allow the consumer to view the actual product on the shelf (at the last collection time) or even dispatch a drone to check stock at that moment. In other embodiments the consumer could make a purchase and have it collected and delivered to their home. This would allow for fast and efficient virtual shopping in traditional as well as completely automated stores (warehouses designed for efficiency without consumer traffic).

FIG. 6 illustrates the system architecture of an audience sensing device according to the present disclosure. The Audience Sensor 950 includes a Communication I/O 953 which supports communications over a Wide Area Network and a Wireless I/O 954 which supports local communications with mobile devices in proximity to the sensor. In a preferred embodiment of the present disclosure, the Audience Sensor 950 serves the function of the Monitoring Station 101 of FIG. 1.

Referring again to FIG. 6, the Audience Sensor 950 is capable of recognizing the unique mobile device identifiers emitted by mobile devices in proximity to the sensor, or determining unique mobile device identifiers from information emitted by the mobile devices (e.g., extract information, monitor information for signatures or other identifying information). The WiFi Module 957 can recognize the WiFi MAC identifiers, the Cellular Module 958 can recognize the identifiers used by the wireless carriers (such as the ESN), and the Custom Module 959 can recognize the wireless emissions ("wireless signature") of the mobile device separate from any standard wireless communications protocol. The use of multiple sensing technologies would thus improve the ability to recognize mobile devices in the event that one or more of these wireless transmissions were not turned on or broadcasting, and would also help to identify distance from the sensor in the event that the signal strength form one of the transmissions was fluctuating. It would also allow for cross-referencing these various device identifiers for the Audience Metrics System 100 of FIG. 1, in the event that one of the identifiers were needed but unavailable (for example, as when the WiFi MAC was a phantom ID as described previously herein).

The primary mode of the Audience Sensor 950 is to capture and report the unique identifiers rather than establish two-way communications with the mobile devices in proximity. However, in some cases the usefulness of the sensor could be improved by also integrating beacon technology which is an outbound signal sent to the mobile device. Presently there are multiple beacon technologies in the market, including one called "iBeacon" which is being supported by Apple. The Beacon Module 960 shown in FIG. 6 is intended to illustrate the beacon functionality of the sensor but is not limited to iBeacon.

The basic purpose of the beacon technology is to allow mobile devices in proximity to recognize the presence of the beacon, and with appropriate software running on the mobile device, cross reference the unique identifier of the beacon with other metadata associated with it (such as its location and other data related to its environment).

Inclusion of the Beacon Module 960 in the Audience Sensor 950 improves the usefulness of the device in that it supports a second market function that is already showing interest. In addition, it enhances the usefulness of the sensing functionality as well, in that it may allow for identification of the mobile device when in beacon sensing mode during which time other identifiers may be blocked or phantom.

LL refers to an intelligent light bulb system. zBeacon refers to mobile device Monitoring Station 101.

Optionally, intelligent light bulbs (e.g. light bulbs that can receive and optionally transmit wireless communications) can be placed in an area (e.g., a store, a mall, and so on) and can be used as wireless receivers (e.g., to determine signal strengths associated with mobile devices as described above). For instance, integration of zBeacon sensors can be made a standard feature of the intelligent light bulbs, or optionally the sensors can be integrated into a USB device, or externally connected, for connection to the bulbs. The intelligent light bulbs can collect broadcast identifiers (e.g., any information that identifiers or is indicative of a mobile device, as described above), for instance through WiFi, Bluetooth, and other standards (e.g., proprietary standards). These light bulbs can further determine signal strengths and associate the signal strengths with broadcast identifiers, and determine locations of mobile devices corresponding to broadcast identifiers. Identifiers can be associated with each intelligent light bulb, and optionally location information, such that the intelligent light bulbs can be uniquely identified and used to determine locations of mobile devices. The intelligent light bulbs can be in a socket adapter form factor. For instance, the socket adapter can screw into a socket first, and provide a same socket on the other side. This socket adapter can implement the functionality described above, and be easily swapped in for any light bulb (e.g., the adapter could be used to determine locations of mobile devices).

The intelligent light bulbs can be used for in-store wayfinding (e.g., products, and services, can be provided to users of mobile devices, for instance by knowing locations of the users through the mobile devices). As described above, the LL devices can be location aware (with appropriate precision), once installed they can report their positions to the cloud. Coupled to a server-like store identification and outside perimeter database, then this entire process could be algorithmic. Triangulation/trilateration algorithms could be run automatically once three or more LL devices are installed on a floor, the entire space can be provisioned for location awareness to all mobile devices. A provision for floor level identification can also be installed. Once the LL devices come online and are automatically provisioned, they would have accurate knowledge of the interior area and outside perimeter of the store, including some store exterior perimeter to use for consumer approach intelligence (window shopping conversion, parking lot-to-store guidance, etc). The next piece of in-store wayfinding intelligence can be the interior layout. Paths available to consumers to be walked can be determined, and paths to products can be determined for each consumer. This could automatically be provisioned by recording the locations of mobile devices. Crowdsourced data could develop interior walkway paths programmatically in a short time frame. The final in-store wayfinding intelligence piece is connecting the product location to the pathways.

In another embodiment of the present disclosure, the Monitoring Station 101 of FIG. 1. can be a mobile phone or other consumer-owned mobile device ("Mobile Device 111") and the Short Range Wireless Receiver 104 can be its internal radio subsystem that is capable of identifying WiFi, Bluetooth, or other wireless signals in proximity to the mobile device. When equipped with an appropriate mobile application, the Mobile Device 111 will poll (e.g., periodically) for any surrounding mobile devices and collect their unique identifiers and signal strengths. This data, along with the device's location (and preferably the method for identifying its location) and time stamp would be forwarded to the Demographics Modeling System [301] for analysis. Since the Mobile Device 111 would generally be able to identify the majority of mobile devices and WiFi access points in its vicinity form this sample, it could serve as a proxy for the audience (count and composition) for any OOH advertising display or retail store. Fixed access points could easily be removed from the audience metrics as additional mobile devices reported the data from the same area. Also the same mobile device could report multiple sample sets some time apart and distance apart which could establish certain wireless signals as stationary.

Using the aforementioned process, multiple mobile devices equipped with the same application could be used to crowd-source the audience measurement at a location of interest. Over time multiple data sets at the same location could be combined to create an average traffic and average demographic profile for the location. As the number of samples increased they would approach the actual average profile for the location.

Due to current battery life limitations, it may be necessary to trigger the data collection process only at certain locations of interest. Current geofencing (e.g., a virtual barrier for a real-world area, volume, which can depend on a time) and proximity triggering technologies are well known in the industry that could be used to achieve this. Building a database of geofences around each OOH advertising unit, the crowd sourced measurement system could be used to efficiently measure average audience metrics at each location without the need for dedicated sensors. This would be appropriate for static OOH ad units which change every several weeks.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the disclosures described herein may be embodied within a form that does not provide all of the features and benefits set forth herein, as some features may be used or practiced separately from others. The scope of certain disclosures disclosed herein is indicated by the appended claims rather than by the foregoing description. All changes which come within the meaning and range of equivalency of the claims are to be embraced within their scope.

What is claimed is:

1. An active beacon system comprising one or more processors and one or more computer storage media storing instructions that when executed by the one or more processors, cause the one or more processors to:
   monitor wireless communications being provided by one or more mobile devices, the mobile devices being within a threshold distance of the active beacon system;
   identify, from the wireless communications, a first broadcast identifier indicated in the wireless communications during a first time period;
   determine a first location corresponding to the first broadcast identifier based on a strength associated with wireless communications that indicate the first broadcast identifier, the first location indicating a location of a mobile device associated with the first broadcast identifier;
   identify, from the wireless communications, a second broadcast identifier indicated in the monitored wireless communications during a second time period;
   determine a second location corresponding to the second broadcast identifier based on a strength associated with wireless communications that indicate the second broadcast identifier;
   determine a likelihood that the first broadcast identifier and the second broadcast identifier are associated with a same particular mobile device of the one or more mobile devices, the determination based on a time difference between the first time period and the second time period, and a difference between the first location and the second location; and
   determine that the first broadcast identifier or second broadcast identifier is a phantom broadcast identifier, wherein the determination is based, at least in part, on historical locations associated with the first broadcast identifier or second broadcast identifier.

2. The active beacon system of claim 1, wherein each broadcast identifier is a MAC address.

3. The active beacon system of claim 1, wherein the first broadcast identifier comprises a unique mobile device identifier captured, measured, determined, or received by one or more sensors, and the second broadcast identifier is measured, determined, received, or identified by a wide area wireless transmitter or receiver.

4. The active beacon system of claim 3, wherein the one or more sensors comprise Short Range Wireless Receivers, audience sensors, Lidar sensors, Leddar sensors, and cameras and wherein the wide area wireless transmitter or receiver is configured to communicate with remote cell towers that may be a part of a cellular service provider system.

5. The active beacon system of claim 1, wherein the instructions further cause the one or more processors to:
   while identifying the second broadcast identifier, determine that the first broadcast identifier is not being indicated in the wireless communications, wherein the likelihood is further based on the determination.

6. The active beacon system of claim 1, wherein the instructions further cause the one or more processors to:
   accessing information identifying broadcast identifiers assigned to mobile devices;
   identifying the first broadcast identifier or second broadcast identifier in the accessed information; and
   associating the identified first broadcast identifier or second broadcast identifier with particular mobile device.

7. The active beacon system of claim 1, wherein the instructions further cause the one or more processors to:
   utilize multiple sensing technologies configured to recognize one or more wireless transmissions from one or more mobile devices;
   recognize one or more unique mobile device identifiers emitted by the one or more mobile devices in proximity to the multiple sensing technologies; and
   determine the unique mobile device identifiers used by wireless carriers and the unique mobile device identifiers from wireless transmissions separate from standard wireless communications protocols.

8. The active beacon system of claim 1, wherein the instructions further cause the one or more processors to:
receive device location records of one or more mobile devices generated by a set of protocols comprising local wireless communication protocols, mobile network communication standards, and device-specific signature broadcasts independent of standard communication protocols; and
determine a probability measure that the mobile device associated with the first broadcast identifier is the same as the mobile device associated with the second broadcast identifier.

9. The active beacon system of claim 8, wherein the probability measure is based on location record factors comprising:
the distance between the mobile device associated with the first broadcast identifier and the mobile device associated with the second broadcast identifier;
the accuracy of the device location records; and
the time differential between the location records.

10. An active beacon system method comprising:
monitoring wireless communications being provided by one or more mobile devices, the mobile devices being within a threshold distance of an active beacon system;
identifying, from the wireless communications, a first broadcast identifier indicated in the wireless communications during a first time period;
determining a first location corresponding to the first broadcast identifier based on a strength associated with wireless communications that indicate the first broadcast identifier, the first location indicating a location of a mobile device associated with the first broadcast identifier;
identifying, from the wireless communications, a second broadcast identifier indicated in the monitored wireless communications during a second time period;
determining a second location corresponding to the second broadcast identifier based on a strength associated with wireless communications that indicate the second broadcast identifier;
accessing information identifying broadcast identifiers assigned to mobile devices;
identifying the first broadcast identifier or second broadcast identifier in the accessed information;
associating the identified first broadcast identifier or second broadcast identifier with particular mobile device; and
determining a likelihood that the first broadcast identifier and the second broadcast identifier are associated with a same particular mobile device of the one or more mobile devices, the determination based on a time difference between the first time period and the second time period, and a difference between the first location and the second location.

11. The method of claim 10, wherein each broadcast identifier is a MAC address.

12. The method of claim 10, wherein the first broadcast identifier comprises a unique mobile device identifier captured, measured, determined, or received by one or more sensors, and the second broadcast identifier is measured, determined, received, or identified by a wide area wireless transmitter or receiver.

13. The method of claim 10, wherein the one or more sensors comprise Short Range Wireless Receivers, audience sensors, Lidar sensors, Leddar sensors, and cameras and wherein the wide area wireless transmitter or receiver is configured to communicate with remote cell towers that may be a part of a cellular service provider system.

14. The method of claim 10, further comprising:
while identifying the second broadcast identifier, determining that the first broadcast identifier is not being indicated in the wireless communications, wherein the likelihood is further based on the determination.

15. The method of claim 10, further comprising:
accessing information identifying broadcast identifiers assigned to mobile devices;
identifying the first broadcast identifier or second broadcast identifier in the accessed information; and
associating the identified first broadcast identifier or second broadcast identifier with particular mobile device.

16. The method of claim 10, further comprising:
utilizing multiple sensing technologies configured to recognize one or more wireless transmissions from one or more mobile devices;
recognizing one or more unique mobile device identifiers emitted by the one or more mobile devices in proximity to the multiple sensing technologies; and
determining the unique mobile device identifiers used by wireless carriers and the unique mobile device identifiers from wireless transmissions separate from standard wireless communications protocols.

17. The method of claim 10, further comprising:
receiving device location records of one or more mobile devices generated by a set of protocols comprising local wireless communication protocols, mobile network communication standards, and device-specific signature broadcasts independent of standard communication protocols; and
determining a probability measure that the mobile device associated with the first broadcast identifier is the same as the mobile device associated with the second broadcast identifier.

18. The method of claim 17, wherein the probability measure is based on location record factors comprising:
the distance between the mobile device associated with the first broadcast identifier and the mobile device associated with the second broadcast identifier;
the accuracy of the device location records; and
the time differential between the location records.

* * * * *